US012785978B2

(12) United States Patent
Tekeoglu et al.

(10) Patent No.: US 12,785,978 B2
(45) Date of Patent: Nov. 3, 2026

(54) DISTRIBUTED LEDGERS FOR ENHANCED MACHINE-TO-MACHINE TRUST

(71) Applicant: The Johns Hopkins University, Baltimore, MD (US)

(72) Inventors: Ali Tekeoglu, Columbia, MD (US); Cameron R. Hickert, Somerville, MA (US); Joseph M. Maurio, Westminster, MD (US); Tamim I. Sookoor, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 521 days.

(21) Appl. No.: 18/313,271

(22) Filed: May 5, 2023

(65) Prior Publication Data

US 2023/0412386 A1 Dec. 21, 2023

Related U.S. Application Data

(60) Provisional application No. 63/352,243, filed on Jun. 15, 2022.

(51) Int. Cl.
*H04L 9/32* (2006.01)
*H04B 17/318* (2015.01)
*H04L 9/00* (2022.01)

(52) U.S. Cl.
CPC .............. *H04L 9/3234* (2013.01); *H04L 9/50* (2022.05); *H04B 17/318* (2015.01)

(58) Field of Classification Search
CPC ........ H04L 9/3234; H04L 9/50; H04B 17/318
(Continued)

(56) References Cited

U.S. PATENT DOCUMENTS 7,904,278 B2 3/2011 Wilson et al.
8,326,579 B2 12/2012 Wilson et al.
(Continued)

FOREIGN PATENT DOCUMENTS

WO WO-2019133805 A1 * 7/2019 .......... H04W 12/009

OTHER PUBLICATIONS

Bahutair "Multi-Perspective Trust Management Framework for Crowdsourced IoT Services" Jan. 12, 2021 (Year: 2021).*
(Continued)

*Primary Examiner* — Michael R Vaughan
*Assistant Examiner* — Saad Ahmad Abdullah
(74) *Attorney, Agent, or Firm* — Todd R. Farnsworth

(57) ABSTRACT

Disclosed herein are system, method, and computer program product embodiments for providing machine-to-machine (M2M) trust using a distributed ledger. This trust may apply to the Internet of Things (IoT) and/or smart cities contexts. To provide M2M trust, a first computing node may generate a trust score for a second computing node. The trust score may comprise four subcomponents: an identification score, an experience score, a recommendation score, and a context score. These subcomponents may be assigned different weights based on different applications. The multifaceted approach to identifying trust for a particular node provides a flexible framework to provide trust between computing nodes in a network. Additionally, the trusts scores may be published to an immutable distributed ledger and used by other computing nodes to determine updated trust scores as additional interactions between computing nodes occur.

20 Claims, 12 Drawing Sheets

Computer System 700

(58) Field of Classification Search
USPC .......................................................... 713/168
See application file for complete search history.

(56) References Cited

U.S. PATENT DOCUMENTS

| | | | | |
|---|---|---|---|---|
| 9,361,524 | B2 * | 6/2016 | Ghanem | G06T 7/215 |
| 10,380,348 | B2 * | 8/2019 | Cheng | H04W 4/70 |
| 2018/0367573 | A1 * | 12/2018 | Ouyang | H04W 12/08 |
| 2019/0226855 | A1 * | 7/2019 | Fu | G01C 21/3484 |
| 2020/0021439 | A1 * | 1/2020 | Sato | G06Q 20/02 |
| 2020/0260228 | A1 * | 8/2020 | Arunachalam | H04W 4/029 |
| 2020/0344236 | A1 * | 10/2020 | Sanghavi | H04L 63/102 |

OTHER PUBLICATIONS

Popov, Serguei, et al., "Equilibria in the Tangle," Computers & Industrial Engineering, Oct. 2019, pp. 160-172, vol. 136, Elsevier.
Liljeqvist, Ivan (Ivanontech), "Blockchain vs Tangle: Untangling The IOTA Tangle," Moralis Academy, Jan. 17, 2021, last accessed May 18, 2023, available at: https://academy.moralis.io/blog/blockchain-vs-tangle-untangling-the-iota-tangle.
Shardeum Content Team, "Tangle Vs Blockchain: Which is Better," Shardeum, Oct. 12, 2022, last accessed May 18, 2023, available at: https://shardeum.org/blog/tangle-vs-blockchain/.
IOTA, "IOTA Smart Contracts Protocol Alpha Release," Mar. 4, 2021, last accessed Mar. 18, 2023, available at: https://blog.iota.org/iota-smart-contracts-protocol-alpha-release/.
Fernández-Caramés, Tiago M., et al., "A Review on the Use of Blockchain for the Internet of Things," IEEE Access, May 31, 2018, vol. No. 6, pp. 32 979-33 001.
Shala, Besfort, et al., "Novel Trust Consensus Protocol and Blockchain-based Trust Evaluation System for M2M Application Services," Internet of Things, Sep. 2019, p. 100058, vol. 7, available at: https://www.sciencedirect.com/science/article/pii/S2542660519301234.
Brotsis, Sotirios, et al., "On the Suitability of Blockchain Platforms for IoT Applications: Architectures, Security, Privacy, and Performance," Computer Networks, May 22, 2021, vol. 191, p. 108005, available at: https://www.sciencedirect.com/science/article/pii/S1389128621001225.
Dai, Hong-Ning, et al., "Blockchain for Internet of Things: A Survey," IEEE Internet of Things Journal, Oct. 2019, pp. 8076-8094, vol. 6, Issue No. 5.
Liu, Ling, et al., "Machine to Machine Trust in the IoT Era," in Proceedings of the 18th International Conference on Trust in Agent Societies, May 10, 2016, pp. 18-29, vol. 1578, ser. TRUST'16, Aachen, DEU: CEUR-WS.org.
Loper, Margaret L., et al., "Machine to Machine Trust in Smart Cities," in 2017 IEEE 37th International Conference on Distributed Computing Systems (ICDCS), Jul. 17, 2017, pp. 1887-1889, Atlanta, GA, USA.
Dorri, Ali, et al., "Device Identification in Blockchain-Based Internet of Things," IEEE Internet of Things Journal, Feb. 19, 2022, pp. 24767-24776, vol. 9.
Grandison, Tyrone, et al., "A Survey of Trust in Internet Applications," IEEE Communications Surveys & Tutorials, Fourth Quarter 2000, pp. 2-16, vol. 3, Issue No. 4.
Lim, Hyo-Sang, et al., "Provenance-Based Trustworthiness Assessment in Sensor Networks," Proceedings of the Seventh International Workshop on Data Management for Sensor Networks, ser. DMSN '10, Sep. 2010, pp. 2-7, Association for Computing Machinery, New York, NY, USA, available at: https://doi.org/10.1145/1858158.1858162.
Hussain, Yasir, et al., "Context-Aware Trust and Reputation Model for Fog-based IoT," IEEE Access, Feb. 10, 2020, pp. 31 622-31 632, vol. 8.
Jiang, Jinfang, et al., "An Efficient Distributed Trust Model for Wireless Sensor Networks," IEEE Transactions on Parallel and Distributed Systems, May 2015, pp. 1228-1237, vol. 26, Issue No. 5.
Railkar, Poonam, N., et al., "Scalable Trust Management Model for Machine To Machine Communication in Internet of Things using Fuzzy Approach," Turkish Journal of Computer and Mathematics Education, 2021, pp. 2483-2495, vol. 12, Issue No. 6.
Klein, Achim, et al., "Exploring IOTA 2.0 Smart Contracts in a Private Network: Developing a Prediction Market," 51 Nodes, Sep. 16, 2021, last accessed: Jun. 7, 2023, available at: https://medium.com/51nodes/exploring-iota-2-0-smart-contracts-ina-private-network-developing-a-prediction-market-c2d81988f75e.
Loscocco,Peter A., et al., "Linux Kernel Integrity Measurement Using Contextual Inspection," Proceedings of the 2007 ACM Workshop on Scalable Trusted Computing, ser. STC '07, Nov. 2007, pp. 21-29, Association for Computing Machinery, New York, NY, USA, available at: https://doi.org/10.1145/1314354.1314362.
Madhavan, Poornima, et al., "A New Look at the Dynamics of Human-Automation Trust: Is Trust in Humans Comparable to Trust in Machines?" in Proceedings of the Human Factors and Ergonomics Society Annual Meeting, 2004, pp. 581-585, vol. 48, Issue No. 3, SAGE Publications CA: Los Angeles.
Choi, Jong Kyu, et al., "Investigating the Importance of Trust on Adopting an Autonomous Vehicle," International Journal of Human-Computer Interaction, Oct. 9, 2015, pp. 692-702, vol. 31, Issue No. 10.
Hu, Luang, et al., "The Classic Security Application in M2M: The Authentication Scheme of Mobile Payment," KSII Transactions on Internet and Information Systems (TIIS), Jan. 31, 2012, pp. 131-146, vol. 6, Issue No. 1.
Lai, Chengzhe, et al., "GLARM: Group-based Lightweight Authentication Scheme for Resource-Constrained Machine to Machine Communications," Computer Networks, Apr. 22, 2016, pp. 66-81, vol. 99.
Erdem, Ahmet, et al., "Blockchain for Ensuring Security, Privacy, And Trust in IoT Environments: The State of the Art," Security, Privacy and Trust in the IoT Environment, 2019, Chapter 6, pp. 97-122.
Zhang, Rui, et al., "Security and Privacy on Blockchain," ACM Computing Surveys (CSUR), Jul. 2019, pp. 1-34, vol. 52, Issue No. 3.
Antonakakis, Manos, et al., "Understanding the Mirai Botnet," in 26th {USENIX} Security Symposium ({USENIX} Security'17), Aug. 16-18, 2017, pp. 1093-1110.
Alkhadra, Rahaf, et al., "Solar Winds Hack: In-Depth Analysis and Countermeasures," in 2021 12th International Conference on Computing Communication and Networking Technologies (ICCCNT). IEEE, 2021, pp. 1-7.
Pendergrass, J. A., et al., "LKIM: Linux Kernel Integrity Measurer," Johns Hopkins APL Technical Digest, 2013, pp. 509-516, vol. 32, Issue No. 2.

* cited by examiner

100A

100C

400B

500A

500B

600B

DISTRIBUTED LEDGERS FOR ENHANCED MACHINE-TO-MACHINE TRUST

CROSS-REFERENCE TO RELATED APPLICATIONS AND INCORPORATION BY REFERENCE

This application claims the benefit of U.S. Provisional Application No. 63/352,243, filed Jun. 15, 2022, the contents of which are incorporated herein by reference in its entirety.

BACKGROUND

As machines become increasingly interconnected, there have been efforts to apply the concept of trust to computational processes. One example of computational trust is machine-to-machine (M2M) trust. Conventional considerations have centered on the problem of authentication. Authentication strives to provide unambiguous identification as a source of computational trust. If the party on the other end of a communication or transaction is a known and trusted entity, trust may be granted to the data exchanged. While useful, this methodology may be too simplistic to account for other scenarios where computer nodes have been compromised or their data is otherwise become unreliable. For example, a particular computing node may be malfunctioning or when malware is introduced to a computing node. The computing node may become a malicious actor and spread disinformation or false information to other computing nodes. Authentication alone may not be able to account for this scenario. Computing nodes receiving disinformation may be deceived and improperly rely on such information.

Similarly, some computing nodes may be unreliable even when maliciousness has not been introduced. For example, "well-intentioned" computing nodes that may nevertheless promulgate erroneous or inaccurate information may still be just as damaging. These scenarios may arise when computing nodes share information, such as in the Internet of Things (IoT), Industrial Internet of Things (IIoT), and smart cities contexts. As these technologies continue to develop, computing nodes will need to be able to judge the trustworthiness of information received from other computing nodes at a large scale and at such a fast speed where human support may not be possible. In some scenarios, authentication alone may be insufficient to provide the necessary trust to these computing nodes.

SUMMARY

Some aspects of this disclosure relate to apparatuses and methods for implementing techniques for providing machine-to-machine (M2M) trust using a distributed ledger. Computing nodes may share information and/or data in a M2M environment. For example, this may occur in Internet of Things (IoT), Industrial Internet of Things (IIoT), and/or smart cities contexts. The shared data may include a sensor measurement, location data, image data, application delivery data, a computed result, and/or other types of data. Each computing node may share data with other computing nodes in a M2M network.

Along with this data, each computing node also generates and uses trust scores to evaluate data being received from other computing nodes. A trust score may be computed in a pairwise fashion. For example, where there are three computing nodes that are sharing data in a network, each of those nodes may generate a trust score for each of the other computing nodes. Computing node A may generate a trust score from its perspective for computing node B. Similarly, computing node C may also generate a trust score from its perspective for computing node B. Computing node B may also generate respective trust scores for computing node A and computing node C. By using and/or sharing these trust scores along with data shared between computing nodes, each computing node is able to evaluate data received from another computing node. For example, each computing node is able to evaluate the trustworthiness of the data received and/or weigh the data received when performing additional calculations or determinations.

To maintain the trustworthiness of the trust scores themselves, the computing nodes use a distributed ledger. The distributed ledger may be a blockchain and/or may use IOTA™ technology such as Tangle. For example, depending on the application, the distributed ledger may use a linked list or a directed acyclic graph as a data structure. The computing nodes may publish determined trust scores to the distributed ledger using smart contract functions. The distributed ledger may be immutable and therefore provide a recordation of trust scores that are reliable. The distributed ledger may also provide resiliency of recorded trust score data against manipulation. Additionally, this recordation may guard against machine-based or network-based failures. This may also provide network-wide and quorum-based recordation of trust scores for the network of computing nodes.

Such ledgers may provide shared, distributed, and/or fault-tolerant databases that network nodes may share. This may avoid a scenario where a single entity controls access to the trust score. The distributed ledger can also be resilient to single points of failure. Further, data integrity in distributed ledgers such as blockchain may be preserved via a cryptographic data structure and lack of reliance in secrets, administrator credentials, or keys. This may also guard against tampering with the data stored on the ledger. After determining a trust score for a particular computing node, other computing nodes may publish determined trust scores to the distributed ledger. Other computing nodes may then retrieve these trust score for further use and analysis.

In some embodiments, a trust score comprises four subcomponents: an identification score, an experience score, a recommendation score, and a context score. The identification score may be a measure of a node's confidence that it can unambiguously identify the entity on the other end of the transaction. The experience score may be a measure of the quality of a node's direct interactions with an entity. The recommendation score may be an aggregate measure of the quality of other nodes' previous interactions with an entity. The context score may be a measure of a node's aptitude for the given task. For example, a context score may indicate to a node the degree to which particular information and/or services that an entity provides is to be trusted. In some embodiments, the trust score generated by $node_i$ for $node_j$ (i.e., how much $node_i$ trusts $node_j$) is provided by the following formula:

$$TrustScore_i^j = \left(\alpha * \text{Identity}_i^j\right) + \left(\beta * \sum_{time} \text{Experience}_i^j\right) + \left(\gamma * \sum_{neighbors} \sum_{time} \text{Recommendation}_{\forall -i}^j\right) + \left(\delta * \text{Context}_i^j\right)$$

In this formula, the weighting factors may add to one in the following manner: $\alpha+\beta+\gamma+\delta=1$. Additional detail for the subcomponents used to generate a trust score will be further discussed below. Each computing node may use and/or compute a trust score for nodes providing information.

These trust scores may be used to provide a multifaceted trust framework comprised of identity verification, experience, context, and recommendation scores to enable high-integrity M2M interactions. The trust framework may be implemented via an IoT-friendly distributed ledger. The trust framework may identify and/or mitigate errors caused by a compromised system component. Further, the trust computation framework is lightweight. This addresses real-world IoT system errors experienced by resource-constrained end-point devices. Computing nodes with limited resources may pose computational challenges when sharing. Further, the number of devices raises scalability obstacles for information sharing among nodes.

In some embodiments, the trust computation framework described in this disclosure provides a continuous, adaptive, and lightweight process for addressing these challenges. In some embodiments, this framework provides robust and multi-faceted trust evaluation for information received by computing nodes. This can be particularly beneficial in the IoT and smart city contexts where vast amounts of data are shared between computing nodes.

Some aspects of this disclosure relate to a method performed by a first computing node including receiving, at the first computing node, a measurement from a second computing node and an identifier corresponding to the second computing node. The method further includes generating, by the first computing node, an identification score based on a comparison of the identifier and an expected identifier corresponding to the second computing node. The method further includes generating, by the first computing node, an experience score corresponding to a difference between the measurement from the second computing node and a measurement generated by the first computing node. The method further includes retrieving, by the first computing node and from a distributed ledger, a trust score corresponding to the second computing node, wherein the trust score was previously calculated by a third computing node and reflects a reliability of the second computing node from a perspective of the third computing node. The method further includes generating, by the first computing node, a recommendation score corresponding to the second computing node based on an aggregation of the trust score with one or more other trust scores retrieved from the distributed ledger. The method further includes generating, by the first computing node, a context score corresponding to a relevance of measurements from the second computing node to the first computing node. The method further includes generating, by the first computing node, an updated trust score for the second computing node by calculating a weighted sum of the identification score, the experience score, the recommendation score, and the context score. The method further includes publishing, by the first computing node, the updated trust score for the second computing node to the distributed ledger via a smart contract operation.

In some aspects, the context score corresponds to a physical distance between the first computing node and the second computing node.

In some aspects, the physical distance is calculated by the first computing node using a received signal strength indicator (RSSI) signal.

In some aspects, the distributed ledger implements a directed acyclic graph data structure.

In some aspects, the recommendation score is calculated based on a temporal aggregation over a sliding window encompassing the one or more other trust scores.

In some aspects, the measurement from the second computing node is a temperature measurement.

In some aspects, the measurement from the second computing node is a counted number of humans in one or more images captured by a camera on the second computing node.

In some aspects, the measurement from the second computing node corresponds to an estimated time of arrival in a rideshare application.

In some aspects, the measurement corresponds to a software product quality and wherein the identification score indicates whether the second computing node has been infected by malware.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing machine-to-machine (M2M) trust using a distributed ledger.

Various embodiments of these features will now be discussed with respect to the corresponding figures.

Figure 1A:
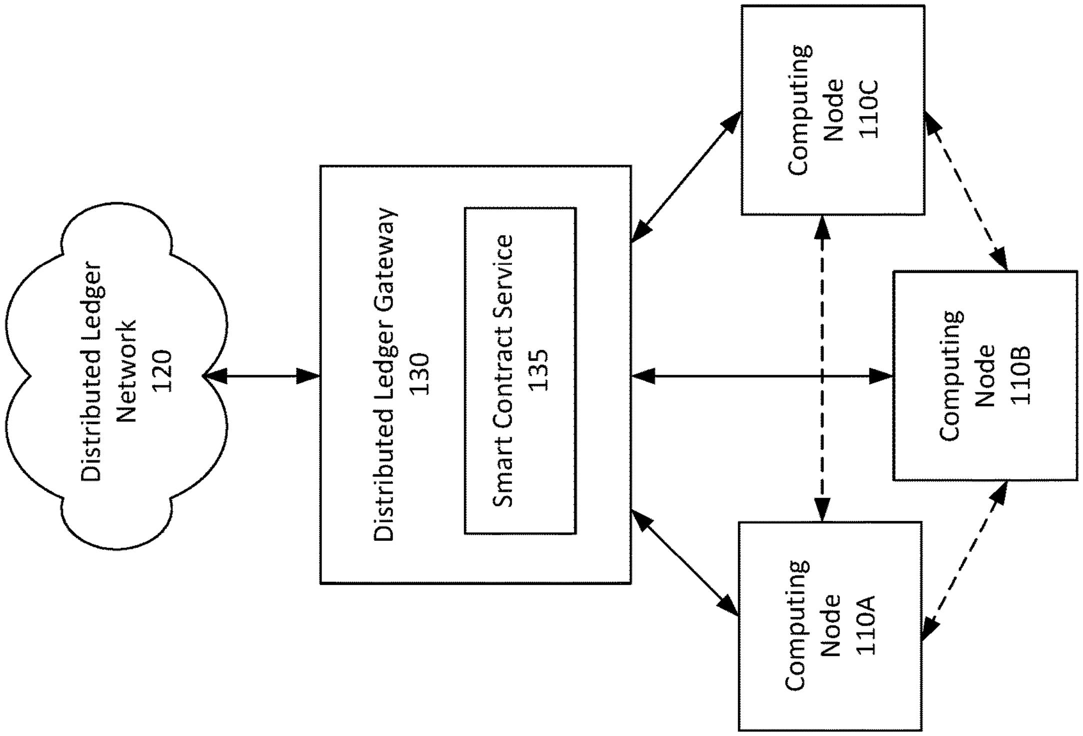
FIG. 1A depicts a block diagram of a machine-to-machine trust environment with a distributed ledger gateway, according to some embodiments.

FIG. 1A depicts a block diagram of a machine-to-machine trust environment 100A with a distributed ledger gateway 130, according to some embodiments. Machine-to-machine trust environment 100A may include one or more computing nodes 110A-110C (collectively 110), a distributed ledger network 120, and/or distributed ledger gateway 130. Distributed ledger gateway 130 may include smart contract service 135. Computing nodes 110 may share data, information, and/or calculated results with each other. Computing nodes 110 may also generate trust scores for other computing nodes 110. Computing nodes 110 may publish generated trust scores to distributed ledger network 120 via distributed ledger gateway 130 and/or via smart contract service 135.

A computing node 110 may include one or more sensors, antennas, transceivers, processors, memory, and/or power systems to provide measurements, information, calculations, and/or data to other computing nodes 110. In some embodiments, computing node 110 may be implemented using computer system 700 as further described with reference to FIG. 7. Computing nodes 110 may be components in a smart city infrastructure, an IoT infrastructure, and/or in a cyber-physical system (CPS). As further explained with reference to FIGS. 3, 4A-4B, 5A-5B, 6A-6B, computing nodes 110 may operate in various contexts and/or provide various services. These may include temperature sensing, computer vision, application tracking, software delivery, and/or other data sharing contexts utilising machine-to-machine trust.

In addition to sharing data and/or information, computing nodes 110 may generate trust scores corresponding to other computing nodes 110. The trust scores may be generated in a pairwise fashion. For example, computing node 110A may generate a trust score for computing node 110B from the perspective of computing node 110A. This trust score may be based on interactions with computing node 110B and/or other factors such as an identification score, an experience score, a recommendation score, and/or a context score as further discussed with reference to FIG. 2. Computing node 110C may also generate a trust score for computing node 110B based on the perspective from computing node 110C. Computing node 110B may generate respective trust scores for computing nodes 110A and 110C. After generating the trust scores, the computing nodes 110 may publish the trust scores to distributed ledger network 120 via distributed ledger gateway 130.

Distributed ledger gateway 130 may include one or more servers and/or databases configured to manage access to distributed ledger network 120. In some embodiments, distributed ledger gateway 130 is implemented using computer system 700 as further described with reference to FIG. 7. Distributed ledger gateway 130 uses smart contract service 135 to publish trust scores to distributed ledger network 120. Distributed ledger network 120 may facilitate the use of a distributed ledger for immutably storing trust scores. For example, distributed ledger network 120 may use a directed acyclic graph and/or a blockchain implementation. For example, a directed-acyclic-graph based implementation such as Tangle may be used. Tangle is described in, for example, "Equilibria in the Tangle" by Serguei Popov, Olivia Saa, and Paulo Finardi, Computers & Industrial Engineering, Volume 136, 2019, Pages 160-172, the contents of which are incorporated herein by reference in its entirety. In some embodiments, distributed ledger network 120 may use a linked list configuration or a directed acyclic graph configuration. Smart contract service 135 may use a distributed ledger layer-1 and/or layer-2 node software implementation. For example, GoShimmer and/or smart contract code deployed on Wasp may be used to interact with distributed ledger network 120. This operation may include reading and/or writing trust scores to distributed ledger network 120. Distributed ledger network 120 may be a lightweight, scalable and efficient distributed ledger architecture that may run on resource constrained Internet-of-Things devices; such as IOTA™. The network (e.g., an IOTA™ network) may be conceptualized as having multiple "layers." GoShimmer may be used to implement Tangle for the communication and network layer (Layer 1). Wasp may be deployed for the application layer (Layer 2), where smart contract service 135 is deployed. Distributed ledger gateway 130 may execute the layers in sync and communicate through separate, specified port numbers.

In some embodiments, smart contract service 135 may be written using the Rust language and compiled to WebAssembly. The smart contract code may then be uploaded to a new chain on the Wasp node. Smart contract service 135 may provide two trust-related functions: get_recommendation_score( ) and/or upload_pairwise_trustscore( ) The get_recommendation_score( ) function returns a weighted recommendation score for a neighbor computing node 110 from the previous trust scores provided by other neighbor computing nodes 110 excluding the caller of the function. For example, if computing node 110A uses the get_recommendation_score( ) function to retrieve a recommendation score related to computing node 110B, distributed ledger gateway 130 may return a recommendation score for computing node 110B. The recommendation score may have been generated by computing node 110C. As further explained with reference to FIG. 2, the recommendation score is a weighted value generated from trust scores provided by other computing nodes (e.g., computing node 110C). The upload_pairwise_trustscore( ) function writes a calculated trust score for a computing node 110 to the state of the smart contract. This may occur upon an interaction with another computing node 110. For example, computing node 110A may calculate and upload a trust score corresponding to computing node 110C. In some embodiments, to call the smart contract functions, computing nodes 110 may be installed with a Wasp client tool, such as wasp-cli.

In addition to maintaining trust scores, the smart contract service 135 may also write measurements and/or data generated by a computing node 110 to the distributed ledger network 120 as well. For example, the distributed ledger network 120 may maintain temperature measurements in addition to trust scores. A computing node 110 may request one or more measurements and/or a weighted aggregate of measurements as a smart contract function. The weighting may be based on the trust scores identified for the nodes providing measurements or data. For example, a smart contract function may return a weighted average of temperature measurements in a particular area based on measurements provided by computing nodes 110A, 110B, and 110C. Each computing node 110 may have provided a temperature measurement that is stored on the distributed ledger network 120. Computing node 110A may then execute a smart contract function to return the weighted measurement. Smart contract service 135 may then retrieve the submitted temperature measurements and apply a weighting to each that corresponds to the trust scores submitted by the other nodes. For example, computing node 110B may have submitted a particular temperature measurement. Computing nodes 110A and 110C may have provided trust scores for computing node 110B. When determining the overall measurement, the smart contract service 135 weighs the temperature measurement provided by computing node 110B based on the trust scores for computing node 110B.

Figure 1B:
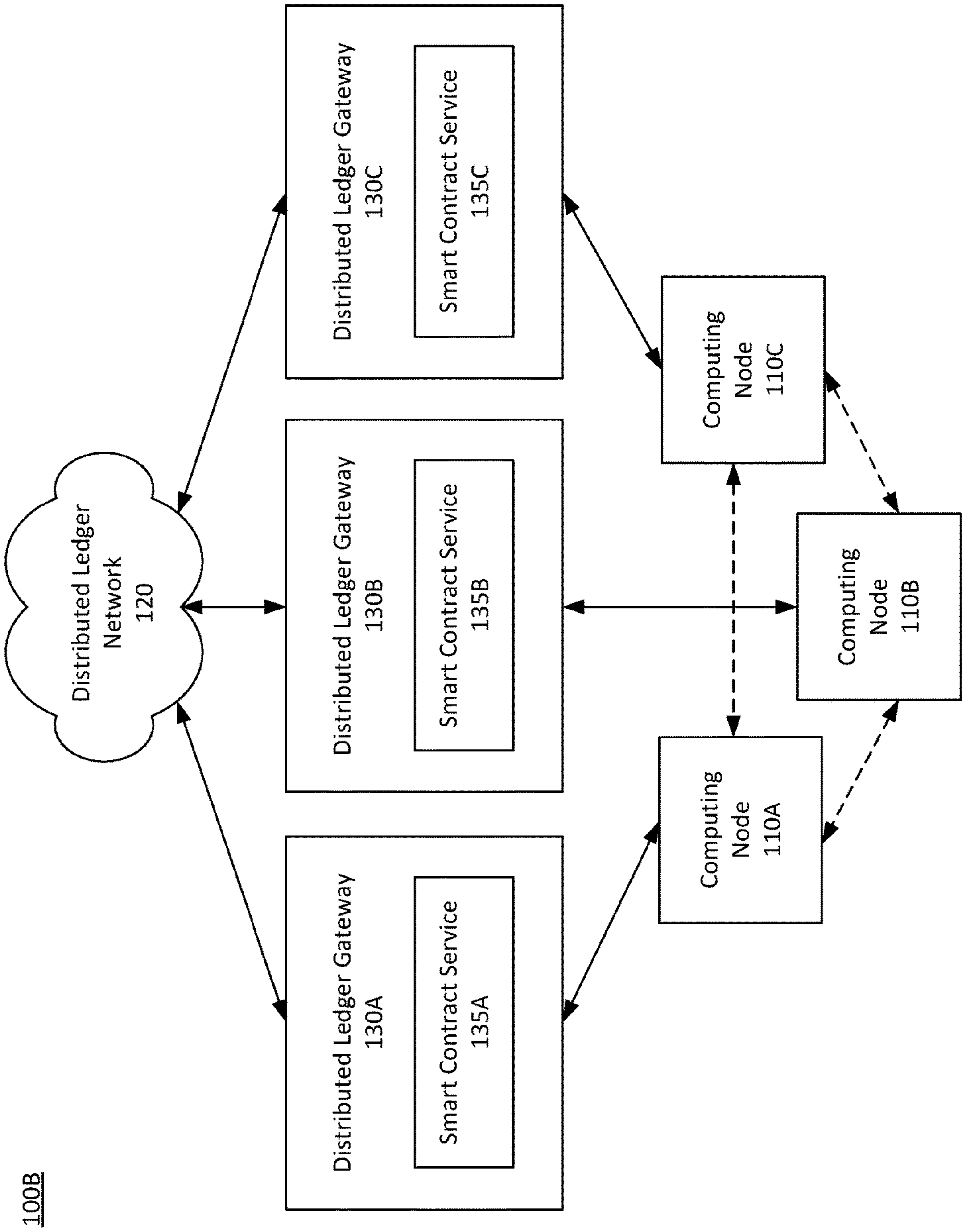
FIG. 1B depicts a block diagram of a machine-to-machine trust environment with a plurality of distributed ledger gateways, according to some embodiments.

FIG. 1B depicts a block diagram of a machine-to-machine trust environment 100B with a plurality of distributed ledger gateways 130A-130C (collectively 130), according to some embodiments. Machine-to-machine trust environment 100B may be similar to machine-to-machine trust environment 100A as described with reference to FIG. 1A. For example, machine-to-machine trust environment 100B includes computing nodes 110, distributed ledger network 120, and distributed ledger gateways 130 with respective smart contract services 135A-135C (collectively 135). Machine-to-machine trust environment 100B differs and provides an alternative embodiment with multiple distributed ledger gateways 130. For example, computing nodes 110 may communicate with different distributed ledger gateways 130 to interface with distributed ledger 120. In some embodiments, computing nodes 110 may communicate with respective distributed ledger gateways 130. In some embodiments, computing nodes 110 may communicate with shared distributed ledger gateways 130.

Figure 1C:
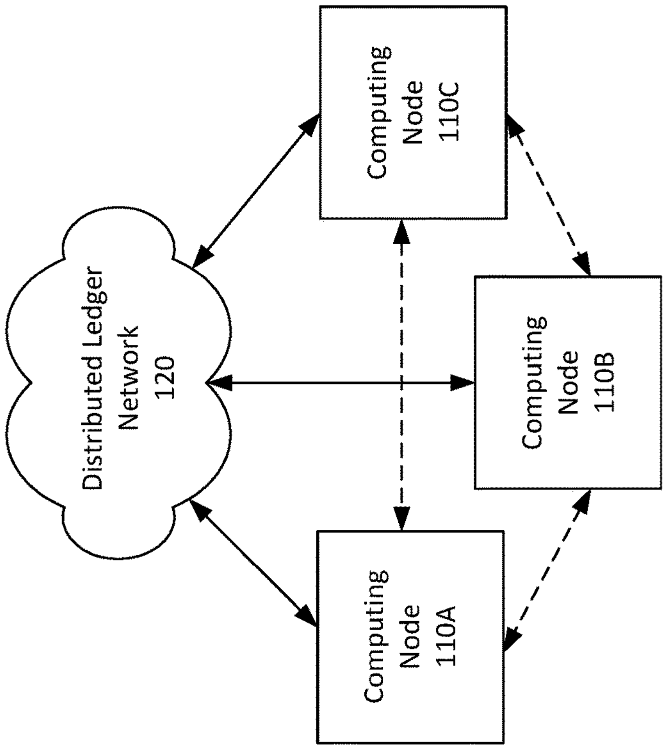
FIG. 1C depicts a block diagram of a machine-to-machine trust environment with computing nodes directly accessing a distributed ledger network, according to some embodiments.

FIG. 1C depicts a block diagram of a machine-to-machine trust environment with computing nodes 110 directly accessing a distributed ledger network 120, according to some embodiments. For example, computing nodes 110 may include distributed ledger gateway functionality, smart contract functionality, or both. In this case, computing nodes 110 may not need to access an external system to access distributed ledger network 120. This functionality may be installed and/or implemented in the computing node 110.

FIGS. 1A, 1B, and 1C depict configurations for computing nodes 110 to share information, generate trust scores, and/or interact with distributed ledger network 120 to publish and retrieve trust scores. While depicted in different configurations, computing nodes 110 and/or distributed ledger gateways 130 may be applied in a combination of configurations. For example, some computing nodes 110 may share a distributed ledger gateway 130, some computing nodes 110 may use a dedicated distributed ledger gateway 130, and/or some computing nodes 110 may not use an external distributed ledger gateway 130 to access distributed ledger network 120.

Figure 2:
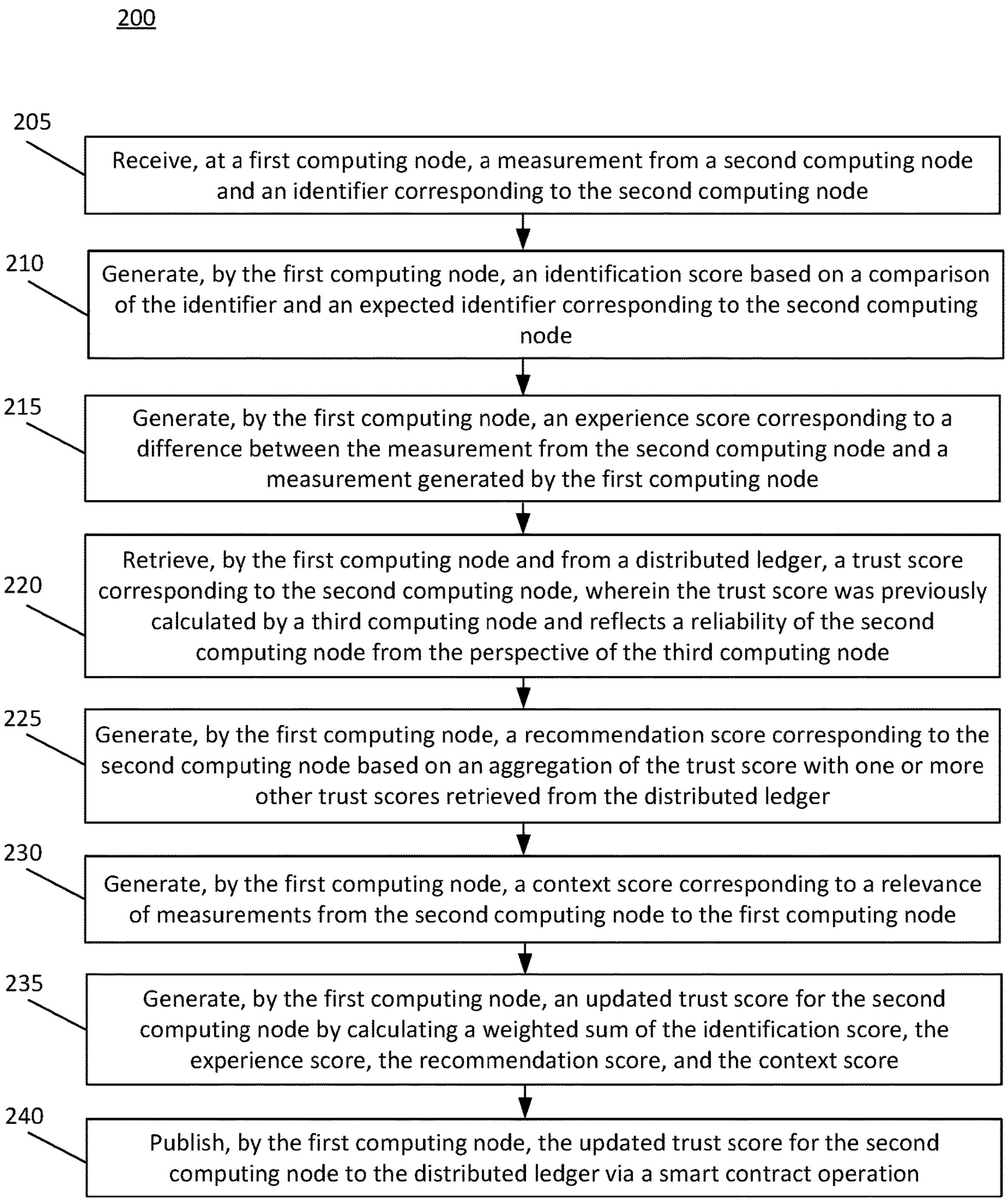
FIG. 2 depicts a flowchart illustrating a method for generating a trust score and publishing the trust score to a distributed ledger, according to some embodiments.

FIG. 2 depicts a flowchart illustrating a method 200 for generating a trust score and publishing the trust score to a distributed ledger, according to some embodiments. Method 200 shall be described with reference to FIG. 1A; however, method 200 is not limited to that example embodiment.

In an embodiment, a first computing node, such as computing node 110A, may utilize method 200 to generate an updated trust score for a second computing node, such as computing node 110B. While method 200 is described with reference to computing node 110A, method 200 may be executed on any computing device, such as, for example, the computer system described with reference to FIG. 7 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 2, as will be understood by a person of ordinary skill in the art.

At 205, first computing node 110A receives a measurement from a second computing node 110B and an identifier corresponding to the second computing node 110B. The first computing node 110A may receive the measurement via any combination of wired and/or wireless networks, which may include mobile communication networks, BLUETOOTH, Local Area Networks (LANs), Wide Area Networks (WANs), and/or the Internet. The measurement may be data, information, and/or a calculation related to smart city or computing infrastructure. For example, the measurement may include a sensor measurement. This may include a temperature measurement, a humidity measurement, and/or other weather related measurement. Similarly, the measurement may be generated via a computer vision determination. For example, a camera at the second computing node 110B may capture image s and/or video of individuals who are walking down a street. The second computing node 110B may determine a number of people counted within a particular timeframe and/or provide this count as the measurement. In some embodiments, second computing node 110B may provide tracking information, such as time of arrival or location information. This may be applicable when the second computing node 110B and/or the first computing node 110A are participating in a rideshare ecosystem. In some embodiments, the second computing node 110B may provide software delivery, reception, defect detection, and/or malware detection information. Other measurements and/or data may be also be provided. First computing node 110A may use and/or rely on such data when performing additional calculations or determinations.

Second computing node 110B may also provide an identifier to the first computing node 110A. This identifier may identify second computing node 110B. The identifier may include credentials, a certificate, a profile name, a profile number, and/or other type of identifier corresponding to second computing node 110B. In some embodiments, the identifier may correspond to an integrity measurer configured to identify malicious modifications to operating processes on a computing node 110. For example, the identifier may correspond to a Linux Kernel Integrity Measurer (LKIM) as described in "LKIM: The Linux Kernel Integrity Measurer," Johns Hopkins APL Technical Digest, Volume 32, Number 2 (2013), and U.S. Pat. Nos. 7,904,278 and 8,326,579, the contents of all three are incorporated herein by reference in their entirety. If a modification of a computing node 110 occurs, this identifier may change and/or may signal to computing nodes 110 receiving data that a malicious attack may have occurred. In some situations, the identifier may be compromised and/or the first computing node 110A may receive an identifier that differs from an expected identifier. For example, first computing node 110A may store an identifier corresponding to the second computing node 110B and may expect to receive the same identifier. The first computing node 110A may perform a check to determine whether the identifier received from the second computing node 110B is the same or differs from the expected identifier. If the identifier differs, first computing node 110A may produce a lower trust score for second computing node 110B.

The next portion of method 200 will discuss the generation of a trust score by the first computing node 110A. First computing node 110A may generate a trust score that corresponds to the second computing node 110B. The trust score may reflect the first computing node's 110A computational perception of the trustworthiness of second computing node 110B.

In some embodiments, a trust score comprises four subcomponents: an identification score, an experience score, a recommendation score, and a context score. The identification score may be a measure of a node's confidence that it can unambiguously identify the entity on the other end of the transaction. The experience score may be a measure of the quality of a node's direct interactions with an entity. The recommendation score may be an aggregate measure of the quality of other nodes' previous interactions with an entity. The context score may be a measure of a node's aptitude for the given task. A context score may indicate to a node the particular information and/or services that an entity provides that can be trusted or not trusted. In some embodiments, the trust score generated by $node_a$ for $node_b$ (i.e., how much $node_a$ trusts $node_b$) may be provided with the following formula:

$$TrustScore_a^b = (\alpha * \text{Identity}_a^b) + \left(\beta * \sum_{time} \text{Experience}_a^b\right) + \left(\gamma * \sum_{neighbors} \sum_{time} \text{Recommendation}_{\forall - a}^b\right) + (\delta * \text{Context}_a^b)$$

In this formula, the weighting factors may add to one in the following manner: $\alpha+\beta+\gamma+\delta=1$. In some embodiments, the weighting factors may be adjusted based on the context of the application. For example, if the identification score is particularly important for a particular application, the weight for that score may be higher. Similarly, if a context score based on distance is particularly important, the weight for that score may be higher. In some embodiments, the coefficient weighting factors may be pre-programmed and/or preconfigured in the computing nodes 110. In some embodiments, computing nodes 110 may dynamically modify the weighting factors based on machine learning and/or artificial intelligence. This may occur via supervised and/or unsupervised machine learning. Using the coefficient weighting factors, the trust score may be calculated by aggregating the weighted identification score, experience score, recommendation score, and/or context score.

At 210, the first computing node 110A generates an identification score based on a comparison of the identifier and an expected identifier corresponding to the second computing node 110B. In some embodiments, this identification may be a binary determination of whether the identifier matches. For example, the check of a match may return a true or false determination. This may correspond to a one or zero value for the identification score. The first computing node 110A may weigh this determination with the a coefficient as indicated above. In this manner, first computing node 110A may determine a weighted identification score as a component of the trust score.

With this subcomponent of the overall trust score, a mismatch in identification may lower an overall trust score. Other subcomponents, however, still exist and may be used to overcome a mismatch in identification. In this manner, a mismatch may not be fatal to the trustworthiness of a particular computing node 110. The other subcomponents may still provide a measure of trustworthiness. The weighting factors may also weigh a mismatch as having less weight as well when calculating a trust score.

At 215, the first computing node 110A generates an experience score corresponding to a difference between the measurement from the second computing node and a measurement generated by the first computing node. In some embodiments, the experience score provides a greater value when the measurement received from the second computing node 110B is similar or close to a measurement performed by the first computing node 110A. In this way, the second computing node 110B may appear more trustworthy to the first computing node 110A when they are producing similar measurements, data, results, and/or calculations. For example, when the computing nodes 110 are sharing temperature measurements for a particular location, if second computing node 110B is reporting a similar temperature measurement to first computing node 110A, the experience score will be higher. An example of such a calculation may be determined with the following equation:

$$\text{Experience} = \frac{1}{(1 + \Delta Temp)}$$

In this example, ΔTemp may be the absolute value of the difference between the received temperature measurement and the first computing node's 110 measured temperature. For example, this may be from a temperature sensor as further discussed with reference to FIG. 3. This formula may be applicable to other measurements where smaller deviations between the measurements result in a higher experience score. In some embodiments, computing nodes 110 may maintain a first-in-first-out (FIFO) buffer of previously calculated experience scores and aggregate these scores into a single experience score.

At 220, the first computing node 110A retrieves, from a distributed ledger, a trust score corresponding to the second computing node 110B. This trust score was previously calculated by a third computing node 110C and reflects a reliability of the second computing node 110B from the perspective of the third computing node 110C. This trust score is also referred to as a recommendation score. The distributed ledger network 120 may maintain and/or store the previous trust scores provided by other computing nodes 110 for a particular node. For example, third computing node 110C may have provided one or more trust scores for second computing node 110B. Similarly, other computing nodes may have also provided trust scores for second computing node 110B. These trust scores may be immutably saved on the distributed ledger. First computing node 110A may access these trust scores via a smart contract function to determine a recommendation score.

At 225, the first computing node 110A generates a recommendation score corresponding to the second computing node 110B based on an aggregation of the trust score with one or more other trust scores retrieved from the distributed ledger. The recommendation score may be an aggregation of multiple trust scores for second computing node 110B. For example, this may be an average trust score. In some embodiments, a time window or sliding time window may also be used to identify the trust scores to use when generating a recommendation score. The time window may specify an amount of time for calculating a recommendation score. For example, trust scores provided in the past day or a number of instances of a trust score may be identified for calculating the recommendation score. In this manner, the recommendation score for second computing node 110B at a particular timestamp may be determined based on aggregating trust scores calculated for second computing node 110B at previous timestamps. For example, first computing node 110A may use a sliding window of the 30 most recent interactions to determine the recommendation score. This may account for transient and/or persistent corruption in the second computing node 110B. The first computing node 110A may calculate an average trust score and use this average as the recommendation score. In some embodiments, the recommendation score used by first computing node 110A may be calculated from trust scores provided by computing nodes 110 other than first computing node 110A. The trust scores may be maintained in the Tangle framework and inside the smart contract state.

In some embodiments, smart contract service 135 may provide the recommendation score to first computing node 110A. For example, first computing node 110A may use a smart contract function call to retrieve the recommendation score. Smart contract service 135 may perform this calculation and produce the recommendation score. For example, this may be using a sliding time window and/or account for trust scores received from computing nodes 110 other than those provided by first computing node 110A.

After calculating and/or retrieving the recommendation score, first computing node 110A may apply a weighting factor γ. The weighting factor may indicate the significance of the recommendation score to the current iteration of the trust score calculation for the second computing node 110B.

At 230, the first computing node 110A generates a context score corresponding to a relevance of measurements from the second computing node 110B to the first computing node 110A. The context score may reflect a separate measurement or separate indicator of relevancy for the second computing node's 110B measurements relative to the first computing node's 110A. For example, distance may be a relevant factor in the example of a temperature measurement. When the second computing node 110B is physically closer to first computing node 110A, the second computing node's 110B measurement may be more relevant and therefore may have a higher context score. In contrast, if the second computing node 110B is farther away from first computing node 110A, the context score may be lower because a difference in temperature may be a result of being in a different location.

To determine such a distance, computing nodes 110 may be equipped with reference signal measurement systems. For example, reference signals transmitted and/or received from computing nodes 110 may provide signal strength measurements. These signal strength measurements may be used to estimate the distance between computing nodes. In some embodiments, the signal strength may be a pairwise measurement and/or may be used to triangulate the location of computing nodes. In some embodiments, these reference signals may be received signal strength indicator (RSSI) signals, such as in the BLUETOOTH and/or WI-FI contexts. In the distance example, a higher detected signal strength results in a higher context score.

After calculating the context score, first computing node 110A may apply a weighting factor δ. The weighting factor may indicate the significance of the context score to the current trust score calculation for the second computing node 110B. While distance has been discussed as an example of context, other context scores may also be used depending on the application. Other context score examples are further discussed with reference to FIGS. 4A, 4B, 5A, 5B, 6A, and 6B.

At 235, the first computing node 110A generates an updated trust score for the second computing node 110B by calculating a weighted sum of the identification score, the experience score, the recommendation score, and the context score. As previously explained, the trust score may be generated with the following formula:

$$TrustScore_a^b = \left(\alpha * \text{Identity}_a^b\right) + \left(\beta * \sum_{time} \text{Experience}_a^b\right) +$$

-continued $$\left(\gamma * \sum_{neighbors} \sum_{time} \text{Recommendation}_{\gamma-a}^b\right) + \left(\delta - \text{Context}_a^b\right)$$

In this formula, the weighting factors may add to one in the following manner: α+β+γ+δ=1. The weighting factors may be modified depending on the context of the application and/or depending on the relative importance of each subcomponent.

At 240, the first computing node 110A publishes the updated trust score for the second computing node to the distributed ledger via a smart contract operation. For example, first computing node 110A may publish the updated trust score to distributed ledger network 120. Other computing nodes 110 may then use the updated trust score provided by first computing node 110A for subsequent recommendation score calculations. In this manner, first computing node 110A may inform other computing nodes 110 of an updated trustworthiness determination for second computing node 110B.

In some embodiments, first computing node 110A may also publish a measurement, data, and/or information to distributed ledger network 120 as well. For example, first computing node 110A may publish the measurement received from second computing node 110B along with the updated trust scores calculated for second computing node 110B. In this manner, other computing nodes 110 may identify a pairwise link between data provided by the second computing node 110B and a corresponding trust score for that data. In some embodiments, first computing node 110A and/or second computing node 110B may publish their own respective data or measurements to distributed ledger network 120. These measurements and/or data may be correlated with respective trust scores.

First computing node 110A may also use the updated trust score to perform further calculations using the measurement received from second computing node 110B. For example, first computing node 110A may compute a trust-weighted temperate estimate. While this example discusses a single measurement received from second computing node 110B, first computing node 110A may also receive measurements from additional computing nodes 110 as well. For example, computing nodes 110 may broadcast data and/or measurements to other computing nodes 110. In this manner, computing nodes 110 may receive data, measurements, and/or information from their neighbors. First computing node 110A may calculate trust scores for each of these other computing nodes 110 and use the trust scores with received measurements to determine a trust-weighted measurement. In some embodiments, first computing node 110A may also publish or upload this trust-weighted measurement to distributed ledger network 120.

In some embodiments, computing nodes 110 may use a smart contract function that requests a calculation based on the data and/or information stored on distributed ledger network 120. For example, the smart contract function may use the measurements and/or trust scores stored on the distributed ledger to return a requested result. In the temperature example, the smart contract function may return a computed temperature based on the temperature measurements of the nodes and weights provided by the respective trust scores. In this manner, first computing node 110A may perform the calculation and/or a computing node 110 may request the calculation from smart contract service 135.

In some embodiments, first computing node 110A may also generate a graphical user interface dashboard that indicates trust scores for other nodes. This dashboard may include one or more graphs that show the change in trust score over time. There may be graphs respective to each other computing node 110 that is being tracked by first computing node 110A. A user may view the one or more graphs to track the change in trust score over time.

Figure 3:
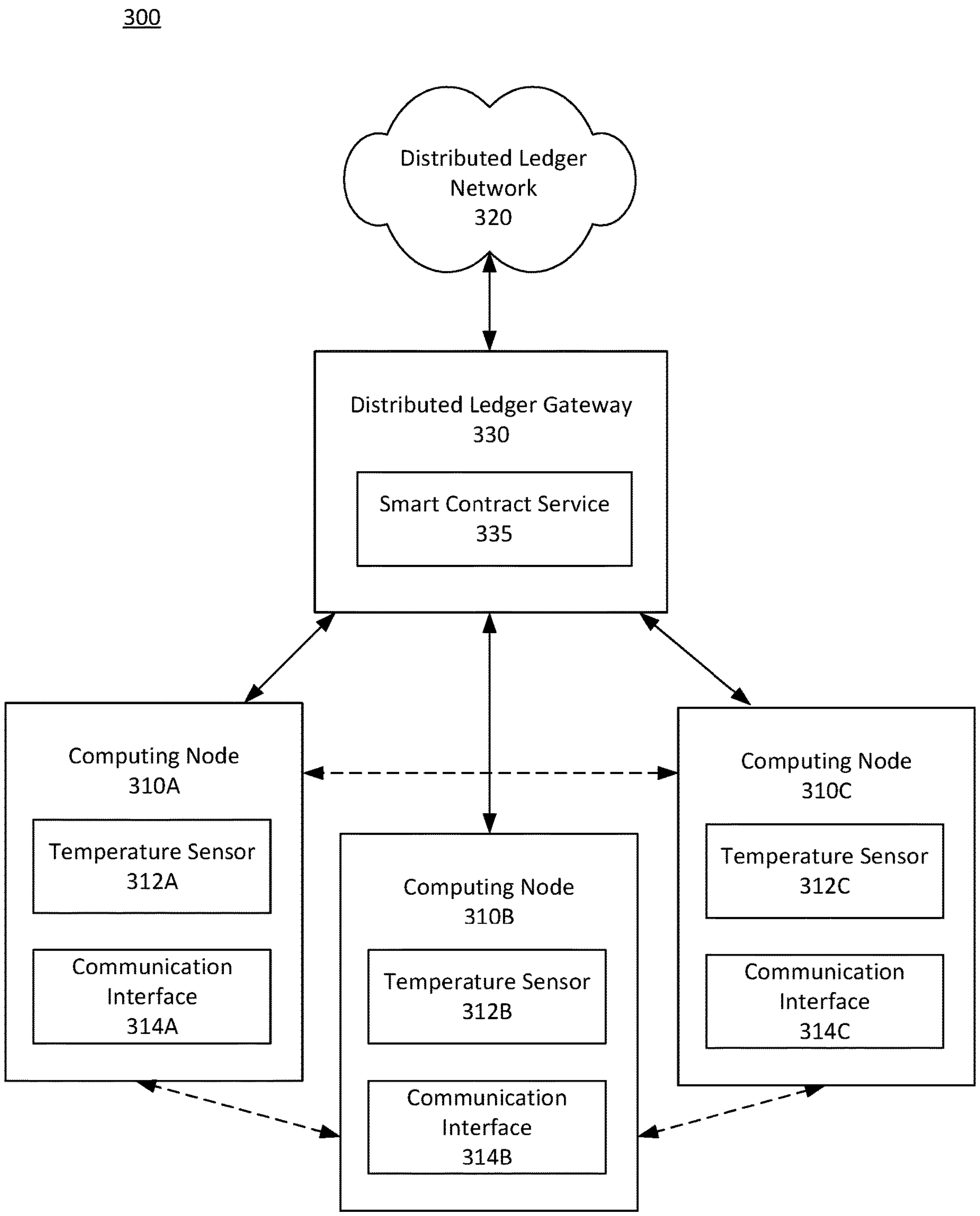
FIG. 3 depicts a block diagram of a machine-to-machine trust environment with temperature sensor determinations, according to some embodiments.

FIG. 3 depicts a block diagram of a machine-to-machine trust environment 300 with temperature sensor determinations, according to some embodiments. Machine-to-machine trust environment 300 may include one or more computing nodes 310, a distributed ledger network 320, and/or distributed ledger gateway 330. Distributed ledger gateway 330 may include smart contract service 335. These components may be similar to those described with reference to FIG. 1. Computing nodes 310A, 310B, 310C (collectively 310) may share data, information, and/or calculated results with each other. Computing nodes 310 may also generate trust scores for other computing nodes 310. Computing nodes 310 may publish generated trust scores to distributed ledger network 320 via distributed ledger gateway 330 and/or via smart contract service 335.

A computing node 310 may include a temperature sensor 312A, 312B, 312C (collectively 312) and/or a communication interface 314A, 314B, 314C (collectively 314). The temperature sensor 312 may be an integrated circuit and/or a surface mounted chip. In some embodiments, the circuit or chip may also include humidity and/or pressure sensors. For example, a BME280 from Bosch Sensortec GmbH may be an example of such a sensor. A computing node 310 may periodically obtain a temperature measurement from temperature sensor 312. To communicate with other computing nodes 310, each computing node may include a communication interface 314. The communication interface 314 may be an interface for communicating via any combination of wired and/or wireless networks, which may include mobile communication networks, BLUETOOTH, Local Area Networks (LANs), Wide Area Networks (WANs), and/or the Internet. For example, computing nodes 310 may communicate with other computing nodes 310 and/or with distributed ledger gateway 330 via communication interface 314.

While still determining its own temperature measurement via temperature sensor 312A, a particular computing node 310A may wish to receive measurements from other computing nodes 310B, 310C to confirm the measurement. For example, temperature sensor 312 may be experiencing a failure, may be inaccurate, and/or may have lost calibration. In this manner, receiving a temperature from another computing node 310 with a high trust score may provide an accurate temperature measurement. The trust scores may also provide protection from malicious and/or inaccurate computing nodes. A particular computing node 310A may give less weight to a measurement provided by a computing node 310B with a low trust score. For example, computing node 310A may perform the method described with reference to FIG. 2.

Figure 4A:
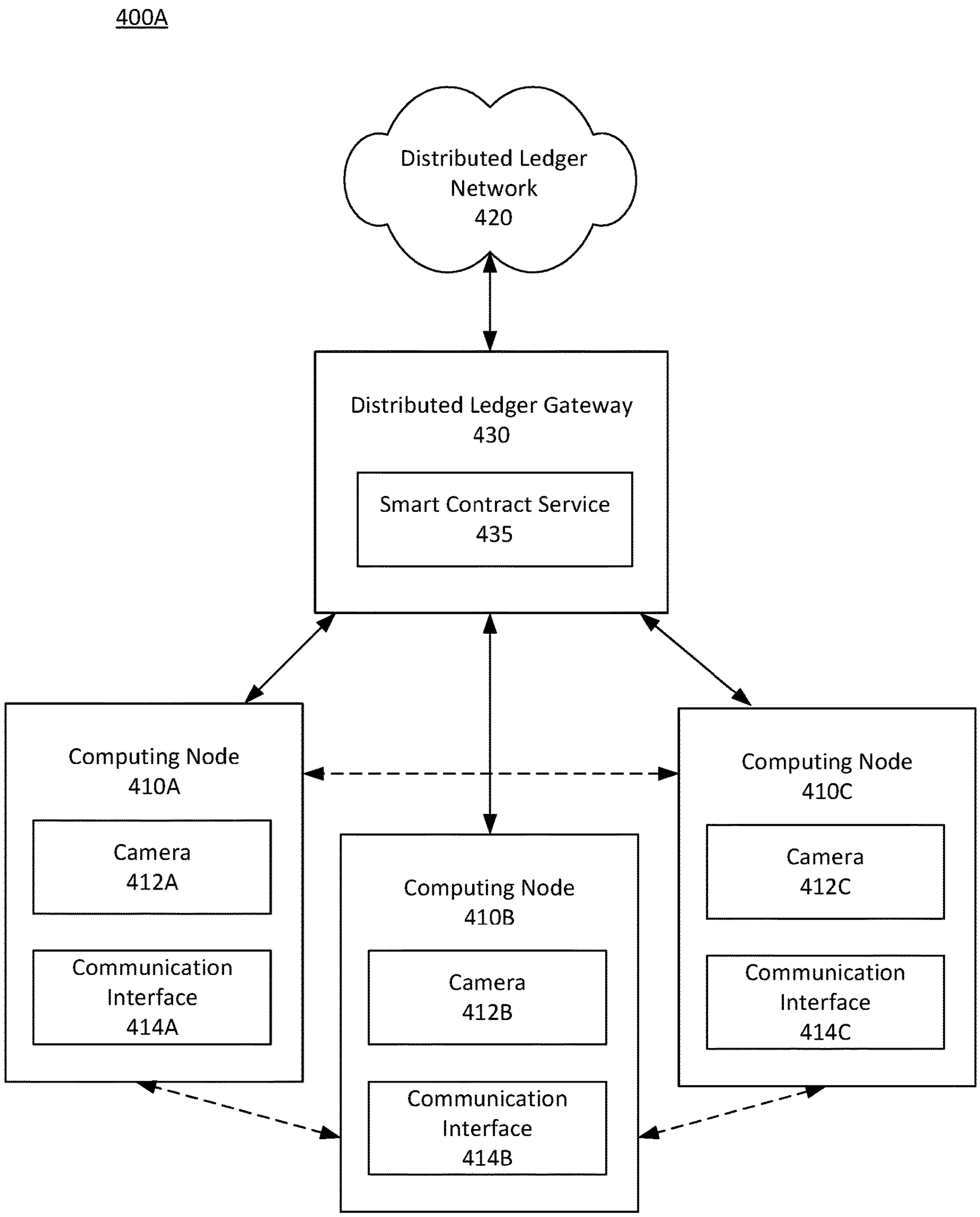
FIG. 4A depicts a block diagram of a machine-to-machine trust environment with camera-based determinations, according to some embodiments.

FIG. 4A depicts a block diagram of a machine-to-machine trust environment 400A with camera-based determinations, according to some embodiments. Machine-to-machine trust environment 400A may include one or more computing nodes 410A, 410B, 410C (collectively 410), a distributed ledger network 420, and/or distributed ledger gateway 430. Distributed ledger gateway 430 may include smart contract service 435. These components may be similar to those described with reference to FIG. 1. Computing nodes 410 may share data, information, and/or calculated results with each other. Computing nodes 410 may also generate trust scores for other computing nodes 410. Computing nodes 410 may publish generated trust scores to distributed ledger network 420 via distributed ledger gateway 430 and/or via smart contract service 435.

A computing node 410 may include a camera 412A, 412B, 412C (collectively 412) and/or a communication interface 414A, 414B, 414C (collectively 414). The communication interface 414 may be similar to the one described with reference to FIG. 3. The camera 412 may capture video and/or images at each computing node 410. For example, computing nodes 410 may be positioned around a geographic area. The cameras 412 may capture images and use image processing to tracking and/or count a number of people passing through the area. Computing node 410 may track the images and perform image processing to identify unique individuals. This example is further described with reference to FIG. 4B.

Figure 4B:
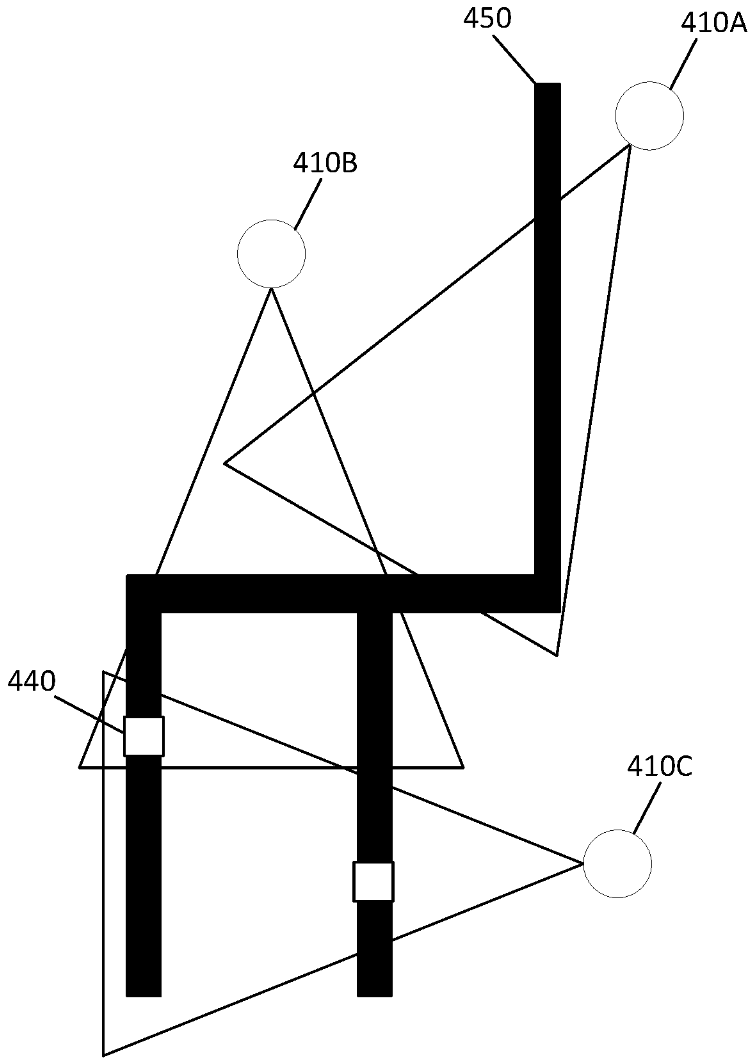
FIG. 4B depicts a block diagram of computer vision environment, according to some embodiments.

FIG. 4B depicts a block diagram of computer vision environment 400B, according to some embodiments. Computer vision environment 400B may include computing nodes 410A, 410B, and 410C. As explained with reference to FIG. 4A, computing nodes 410A, 410B, and 410C may include respective cameras 412. The coverage area of the cameras 412 is depicted in the triangle portions of FIG. 4B. The cameras 412 may have coverage areas that cover a path 450. The path 450 may be, for example, a sidewalk, a street, a roadway, and/or other type of path. As depicted in FIG. 4B, the coverage area provided by the respective cameras 412 may overlap and/or may be used in conjunction to cover path 450.

With these coverage areas, computing nodes 410A, 410B, and 410C may track moving objects 440. Moving objects 440 may be, for example, a pedestrian, a car, and/or other object in motion. Based on the video and/or images captured by the respective cameras 412, computing nodes 410 may track a number of detected and/or unique moving objects 440. For example, cameras 412 may track pedestrians walking path 450 through a campus. As the moving objects 440 move through path 450, the moving objects 440 may leave certain coverage areas and/or enter other coverage areas. In this manner, computing nodes 410A, 410B, and 410C may share tracking information in order to accurately identify a number of moving objects 440 along the path 450. The data and/or measurement may be the number of detected moving objects by a particular computing node 410.

Each computing node 410 may still generate a trust score for each other computing node 410. In some embodiments, because the computing nodes 410 and cameras 412 are part of a predefined network, they are assumed to be authenticated. In this manner, the identity scores may be set to one and/or not used in the trust score determination. The experience score may be similar to the temperature example described with reference to FIG. 2. One difference may be that a logistic function may be used as the difference function. The logistic function may be empirically defined based on testing and the tracking of moving objects 440 as they move between images captured by the cameras 412. In some embodiments, a computing node's 410 experience scores are not aggregations over multiple timesteps. Rather, the experience scores are calculated based on reported values at a particular time.

For the recommendation score, each computing node's 410 cumulative trust score from the previous timestep becomes the recommendation score for the next timestep. This may be similar to the recommendation score described with reference to FIG. 2 and the sensing of temperature.

For the context score, the context may coincide with an accuracy of the camera 412 to capture a coverage area. For example, the context score may reflect potential glare on a camera. Glare may reduce a particular camera's 412 accuracy. The glare may be dependent on the time of data. For example, glare levels may be identified for each hour of the day. The context score is determined based on the glare difference among the cameras 412.

Using these subcomponents, a computing node 410 may determine a traffic estimate for path 450 by summing over all computing nodes 410 and respective cameras 412 based on a weighting according to normalized trust scores.

Figure 5A:
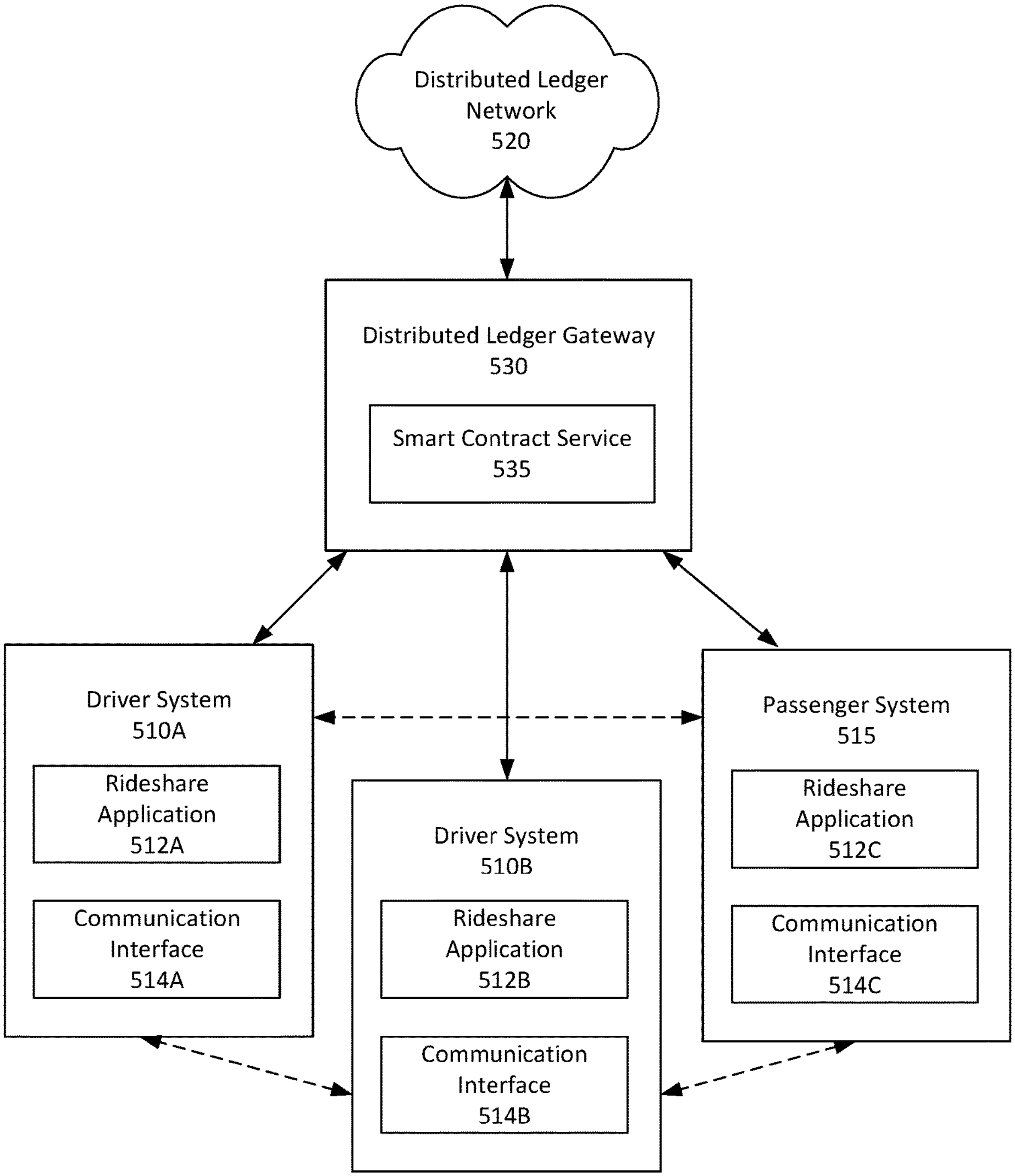
FIG. 5A depicts a block diagram of a machine-to-machine trust environment with rideshare application determinations, according to some embodiments.

FIG. 5A depicts a block diagram of a machine-to-machine trust environment 500A with rideshare application determinations, according to some embodiments. Machine-to-machine trust environment 500A may include one or more driver systems 510A, 510B (collectively 510), passenger systems 515, a distributed ledger network 520, and/or distributed ledger gateway 530. Distributed ledger gateway 530 may include smart contract service 535. These components may be similar to those described with reference to FIG. 1. Driver systems 510 and/or passenger systems 515 may include a rideshare application 512A, 512B, 512C (collectively 512) and/or a communication interface 514A, 514B, 514C (collectively 514). The communication interface 514 may be similar to the one described with reference to FIG. 3. A rideshare application 512 may be software installed on each of the systems to facilitate matching between driver systems 510 and passenger systems 515.

Driver systems 510 and/or passenger systems 515 may be operating in a system where different categories of computing nodes are interacting. The following is an example of a rideshare scenario, but this configuration may also be applicable to other fields where a recommendation subcomponent is weighed more heavily than an experience subcomponent.

In the rideshare scenario, driver system 510 may provide rideshare services. A driver or user of driver system 510 may identify passengers. The passengers may use passenger system 515A, 515B (collectively 515). Drivers may compete for fares based upon their arrival time to a passenger. The management of connecting drivers to passengers may occur via rideshare application 512. An example of this scenario is depicted in FIG. 5B.

Figure 5B:
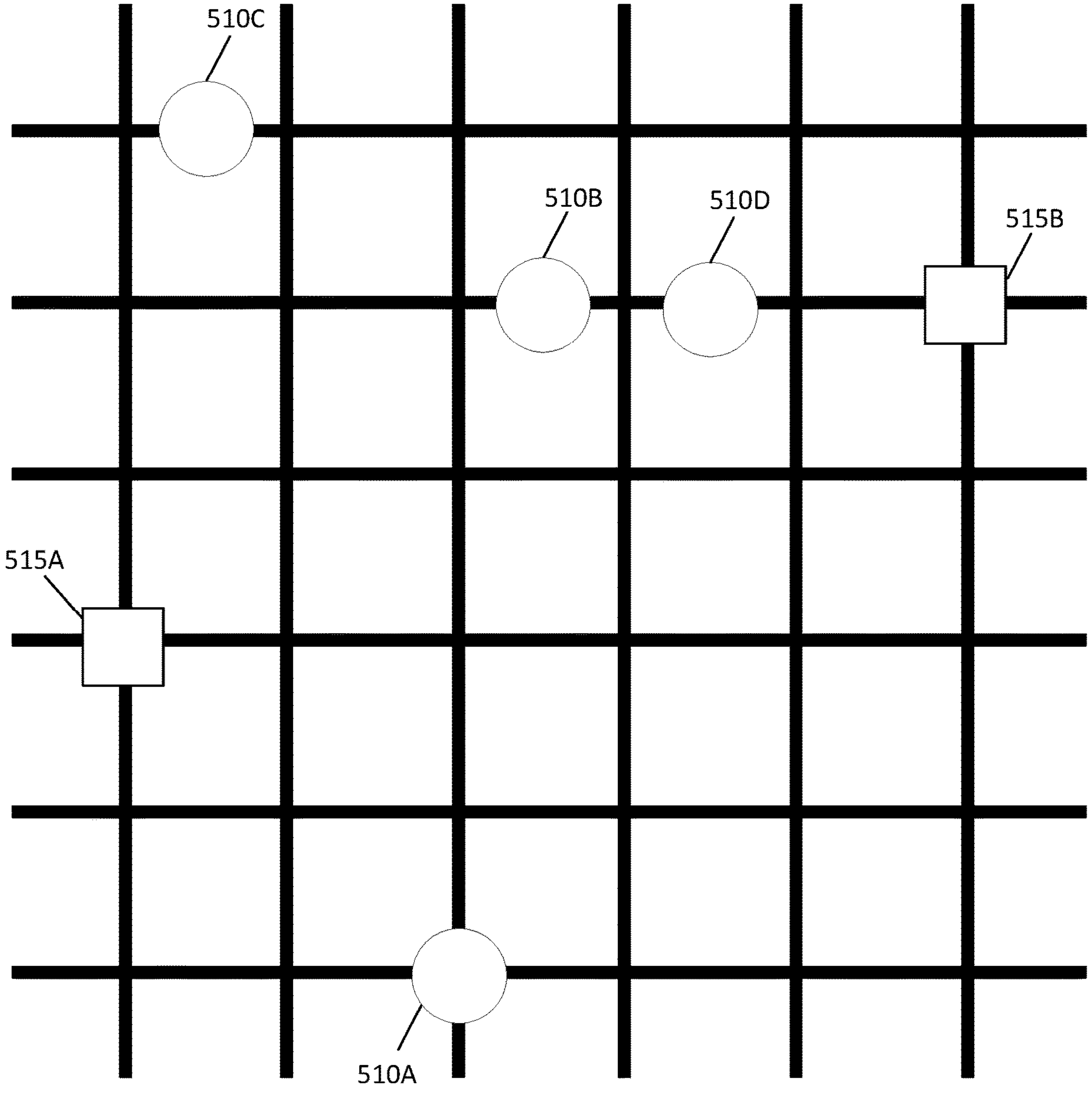
FIG. 5B depicts a block diagram of a rideshare application environment, according to some embodiments.

FIG. 5B depicts a block diagram of a rideshare application environment 500B, according to some embodiments. Rideshare application environment 500B may include driver systems 510 and passenger systems 515. The driver systems 510 and passenger systems 515 may be positioned in different geographic locations. For example, the positioning may be based on a city street grid. Using a respective instance of rideshare application 512, a passenger system 515 may request a driver with the particular driver system 510 being selected based on shortest time to arrival. In some embodiments, driver systems 510 may perform the computation, bidding, and/or matching process.

In some scenarios, a driver may attempt to cheat this determination by modifying their respective rideshare applications 512 to report false times that are earlier than the true expected arrival times. In this scenario, the agents evaluating trust may be the passenger systems 515. Passenger systems 515, however, may have limited experience repeatedly interacting with the same driver systems 510. In this manner, passengers systems 515 may depend on reports from other passenger systems 515 who are also determining the trustworthiness of a particular driver system 510. In this manner, passenger systems 515 may place a higher weight on the recommendation score subcomponent of the trust score. For example, the weight for the recommendation score may be higher than the weight for the experience score subcomponent. Because honest and/or dishonest driver systems 510 may under or over estimate arrival due to standard traffic stochasticity, the recommendation score subcomponent may be more relevant to identify those driver systems that are consistently under-estimating the time of arrival when interacting with multiple passenger systems 515.

The experience score may correspond to how a given driver system's 510 estimated time of arrival accorded with its actual time of arrival for a particular passenger system 515. This may be provided and/or measured based on timestamps and/or based on a unit of time, such as minutes. The experience score may be weighted lower than the recommendation score, however, because of the rare circumstance where individual riders would repeat rides with the same driver. In contrast, the recommendation scores reflect the aggregate experience of other passenger systems 515 with a particular driver system 510. The context score may correspond to the passenger system's initial distance from the driver system 510 when arrival time estimates are generated. Using these subcomponents, passenger systems 515 may generate trust scores for particular driver systems 510.

Using the trust scores, driver systems 515 and their corresponding drivers may be assigned to passenger systems 515 requesting a ride. The trust score may be used to weigh estimated arrival times. A driver system 515 having a low trust score may have its estimated arrival time penalized relative to other driver systems 515 that have higher trust scores. In this manner, the weighing of estimated arrival times may be adjusted based on trust score.

Figure 6A:
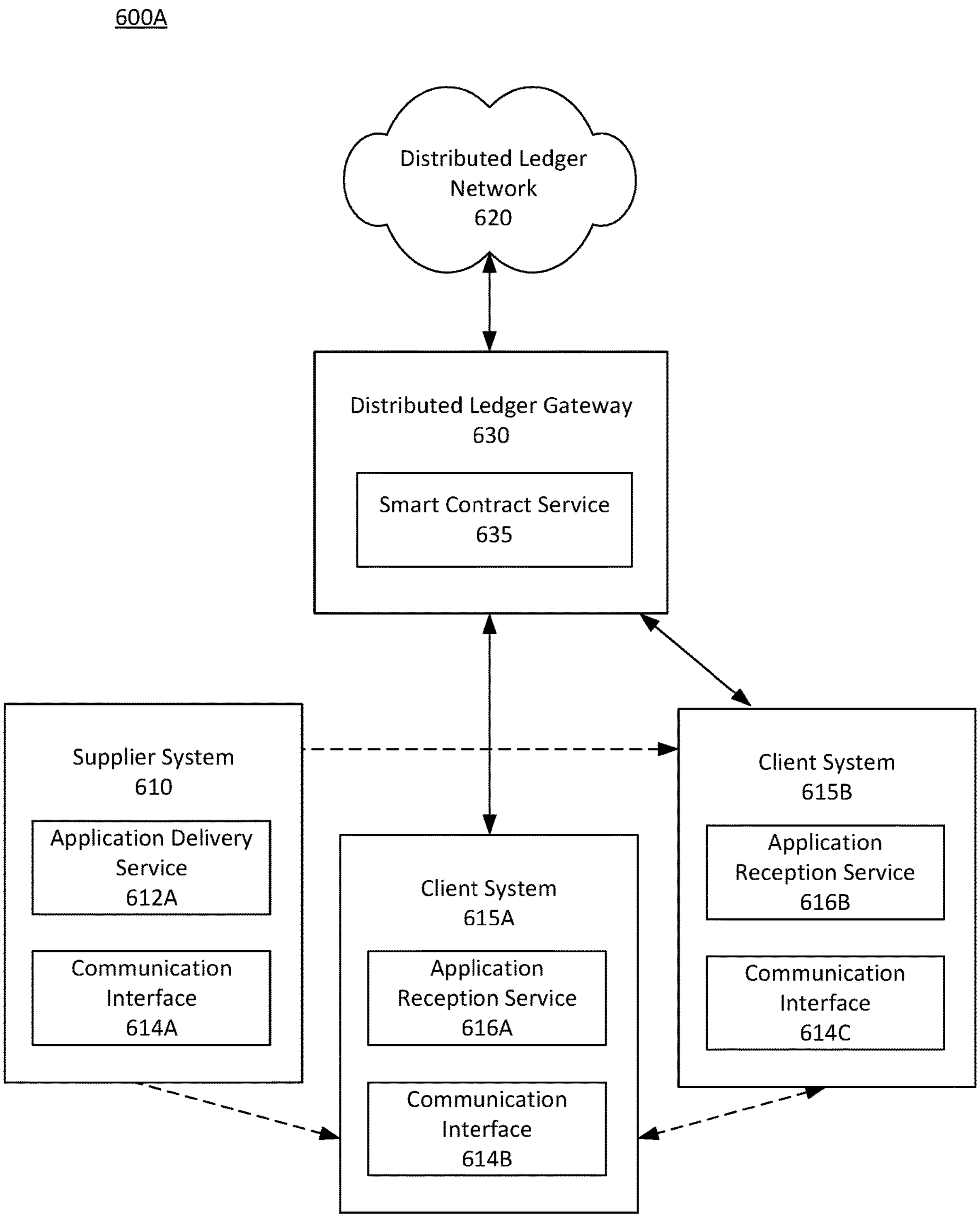
FIG. 6A depicts a block diagram of a machine-to-machine trust environment with application delivery and reception determinations, according to some embodiments.

FIG. 6A depicts a block diagram of a machine-to-machine trust environment with application delivery and reception determinations, according to some embodiments. Machine-to-machine trust environment 600A may include one or more supplier systems 610, client systems 615A, 615B (collectively 615), a distributed ledger network 620, and/or distributed ledger gateway 630. Distributed ledger gateway 630 may include smart contract service 635. These components may be similar to those described with reference to FIG. 1. A supplier system 610 may include an application delivery service 612A and a communication interface 614A. Client systems 615 may include an application reception service 616A, 616B (collectively 616) and/or a communication interface 614. The communication interface 614 may be similar to the one described with reference to FIG. 3. Application delivery service 612 may correspond to a service delivering a product and/or a software application to another node, such as client system 615. Client system 615 may include application reception service 616 to receive the product and/or the software application.

In some embodiments, supplier systems 610 and client systems 615 may be configured in a supply chain configuration, which facilitates movement of a product to different computing nodes. As the product moves through the supply chain from supplier system 610 to client system 615, the client systems 615 may further deliver the product to another client system 615. When further delivering the product, the client system 615 may become a supplier system 610. An example of this supply chain movement is depicted in FIG. 6B.

Figure 6B:
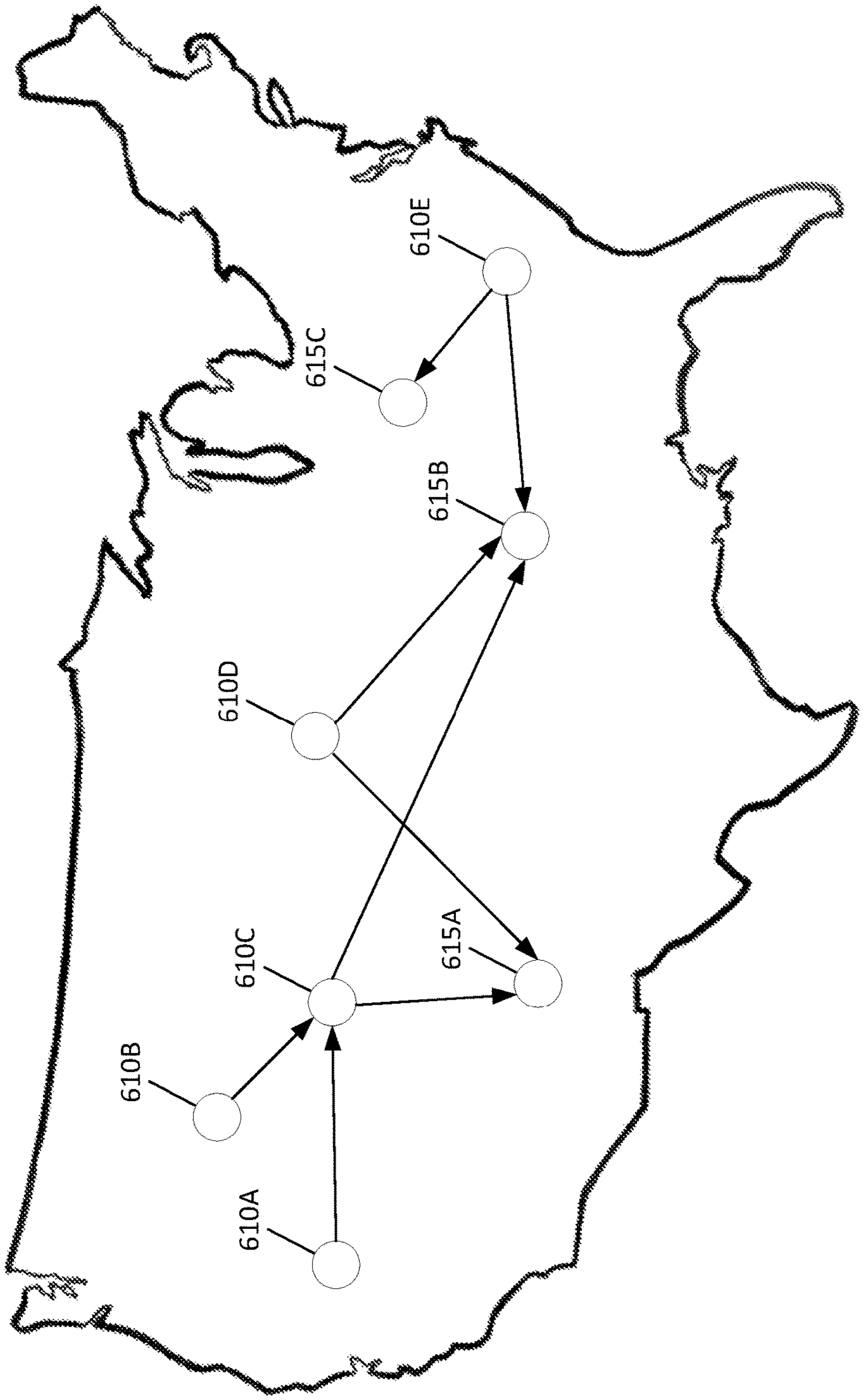
FIG. 6B depicts a block diagram of an application delivery and reception environment, according to some embodiments.

FIG. 6B depicts a block diagram of an application delivery and reception environment 600B, according to some embodiments. Application delivery and reception environment 600B may include supplier systems 610A-610E (collectively 610) and client systems 615. Application delivery and reception environment 600B depicts the movement of a particular product and/or application across different geographic nodes. For example, supplier system 610A may distribute a product to supplier system 610C. Supplier system 610C may have previously been considered a client system based on the reception of the product. Supplier system 610C may then distribute the product to client system 615B. Client system 615B may also receive another product from supplier system 610E. In some embodiments, client system 615B may combine the received products to generate a new product. For example, this may be a combination of software code or an application.

While supplier systems 610 may provide products to client systems 615, a defect may be introduced into the product at a particular point in the supply chain. In some embodiments, malware may be introduced into the product at a supplier system 610 node. To address these issues, client system 615 may wish to shift upstream supplier systems 610 to improve the quality of their product. This may be balanced, however, with costs associated with receiving a product from a supplier system 610 located at a further distance away from a client system 615. A particular client system 615 may wish to output a product with minimal defects and malware while still minimizing production costs.

To facilitate this weighing of considerations, a trust score approach may be used. For example, a quality metric may be assigned to different supplier systems 610. For example, this may be a percentage out of 100%. A client system 615 may receive a product which may include a defect or malware. If a client system 615 receives a product with a defect, this may lower the quality of resulting products. If a client system 615 receives a product with malware, however, further products produced by the client system 615 may also suffer from a malware infection. This may negatively impact downstream client systems 615.

To account for this scenario, trust scores may be calculated for supplier systems 610 and/or client systems 615 who become supplier systems 610 via further delivery of a product. The experience score may correspond to a particular client system's 615 interactions with a supplier system 610. The recommendation score may correspond to other client systems' 615 interaction with that supplier system 610. The context score may correspond to a distance between systems. These may be calculated in a manner similar to that process described with reference to FIG. 2. A supplier system's 610 identity score, however, may be reduced due to the detection of malware. For example, a client system 615 may lower the identity score for a supplier system 610 when the client system 615 has determined that the supplier system 610 is producing malware. In this scenario, the supplier system's 610 identity may have been undermined by the product of malware. Defects may also be treated in a similar manner and/or may not impact the identity score.

Figure 7:
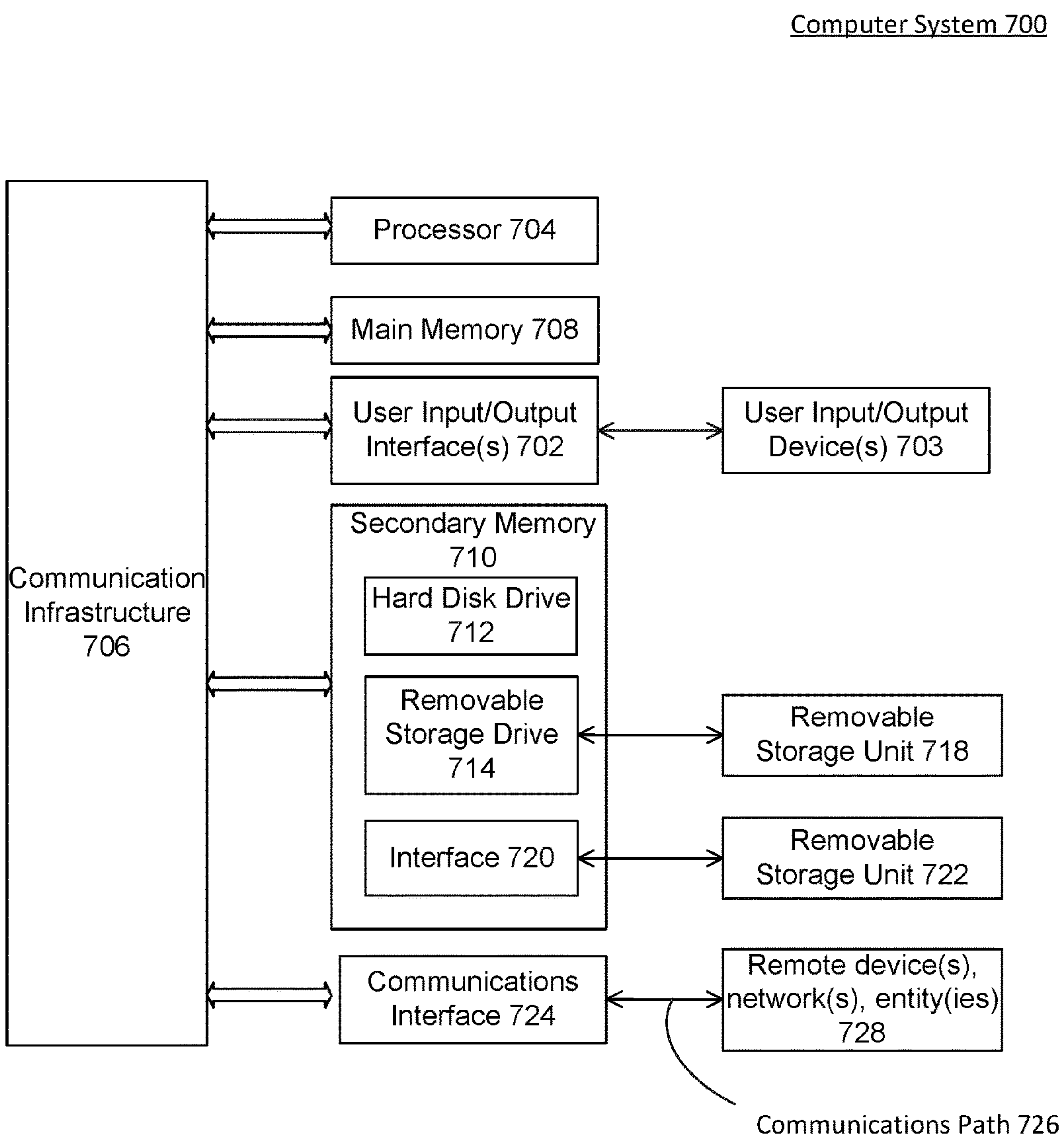
FIG. 7 depicts an example computer system useful for implementing various embodiments.

Various embodiments may be implemented, for example, using one or more well-known computer systems, such as computer system 700 shown in FIG. 7. Computer system 700 can be used, for example, to implement process 200 of FIG. 2. For example, computer system 700 may implement and/or execute a set of instructions comprising operations to generate a trust score and/or interact with a distributed ledger to publish a trust score for another system. This operation may occur in a configuration as shown in FIGS. 1A-1C, FIG. 3, FIG. 4A, FIG. 5A, and/or FIG. 6A. Computer system 700 can be any computer capable of performing the functions described herein. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XEITML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:

receiving, at a first computing node, a measurement from a second computing node and an identifier corresponding to the second computing node;

generating, by the first computing node, an identification score based on a comparison of the identifier and an expected identifier corresponding to the second computing node;

generating, by the first computing node, an experience score corresponding to a difference between the measurement from the second computing node and a measurement generated by the first computing node;

retrieving, by the first computing node and from a distributed ledger, a trust score corresponding to the second computing node, wherein the trust score was previously calculated by a third computing node and reflects a reliability of the second computing node from a perspective of the third computing node;

generating, by the first computing node, a recommendation score corresponding to the second computing node based on an aggregation of the trust score with one or more other trust scores retrieved from the distributed ledger;

generating, by the first computing node, a context score corresponding to a relevance of measurements from the second computing node to the first computing node;

generating, by the first computing node, an updated trust score for the second computing node that reflects a reliability of the second computing node from a perspective of the first computing node by calculating a weighted sum of the identification score, the experience score, the recommendation score, and the context score; and publishing, by the first computing node, the updated trust score for the second computing node to the distributed ledger via a smart contract operation.

2. The method of claim 1, wherein the context score corresponds to a physical distance between the first computing node and the second computing node.

3. The method of claim 2, wherein the physical distance is calculated by the first computing node using a received signal strength indicator (RSSI) signal.

4. The method of claim 1, wherein the distributed ledger implements a directed acyclic graph data structure.

5. The method of claim 1, wherein the recommendation score is calculated based on a temporal aggregation over a sliding window encompassing the one or more other trust scores.

6. The method of claim 1, wherein the measurement from the second computing node is a temperature measurement.

7. The method of claim 1, wherein the measurement from the second computing node is a counted number of humans in one or more images captured by a camera on the second computing node.

8. The method of claim 1, wherein the measurement from the second computing node corresponds to an estimated time of arrival in a rideshare application.

9. The method of claim 1, wherein the measurement corresponds to a software product quality and wherein the identification score indicates whether the second computing node has been infected by malware.

10. A first computer system, comprising:

a memory; and at least one processor coupled to the memory and configured to:

receive a measurement from a second computer system and an identifier corresponding to the second computer system;

generate an identification score based on a comparison of the identifier and an expected identifier corresponding to the second computer system;

generate an experience score corresponding to a difference between the measurement from the second computer system and a measurement generated by the first computer system;

retrieve, from a distributed ledger, a trust score corresponding to the second computer system, wherein the trust score was previously calculated by a third computer system and reflects a reliability of the second computer system from the perspective of the third computer system;

generate a recommendation score corresponding to the second computer system based on an aggregation of the trust score with one or more other trust scores retrieved from the distributed ledger;

generate a context score corresponding to a relevance of measurements from the second computer system to the first computer system;

generate an updated trust score for the second computer system that reflects a reliability of the second computing node from a perspective of the first computing node by calculating a weighted sum of the identification score, the experience score, the recommendation score, and the context score; and publish the updated trust score for the second computer system to the distributed ledger via a smart contract operation.

11. The first computer system of claim 10, wherein the context score corresponds to a physical distance between the first computer system and the second computer system.

12. The first computer system of claim 11, wherein the physical distance is calculated by the first computer system using a received signal strength indicator (RSSI) signal.

13. The first computer system of claim 10, wherein the distributed ledger implements a directed acyclic graph data structure.

14. The first computer system of claim 10, wherein the recommendation score is calculated based on a temporal aggregation over a sliding window encompassing the one or more other trust scores.

15. The first computer system of claim 10, wherein the measurement from the second computer system is a temperature measurement.

16. The first computer system of claim 10, wherein the measurement from the second computer system is a counted number of humans in one or more images captured by a camera on the second computer system.

17. The first computer system of claim 10, wherein the measurement from the second computer system corresponds to an estimated time of arrival in a rideshare application.

18. The first computer system of claim 10, wherein the measurement corresponds to a software product quality and wherein the identification score indicates whether the second computer system has been infected by malware.

19. A non-transitory computer-readable medium having instructions stored thereon that, when executed by at least one computing device, cause the at least one computing device to perform operations comprising:

receiving, at a first computing node, a measurement from a second computing node and an identifier corresponding to the second computing node;

generating, by the first computing node, an identification score based on a comparison of the identifier and an expected identifier corresponding to the second computing node;

generating, by the first computing node, an experience score corresponding to a difference between the measurement from the second computing node and a measurement generated by the first computing node;

retrieving, by the first computing node and from a distributed ledger, a trust score corresponding to the second computing node, wherein the trust score was previously calculated by a third computing node and reflects a reliability of the second computing node from the perspective of the third computing node;

generating, by the first computing node, a recommendation score corresponding to the second computing node based on an aggregation of the trust score with one or more other trust scores retrieved from the distributed ledger;

generating, by the first computing node, a context score corresponding to a relevance of measurements from the second computing node to the first computing node;

generating, by the first computing node, an updated trust score for the second computing node that reflects a reliability of the second computing node from a perspective of the first computing node by calculating a weighted sum of the identification score, the experience score, the recommendation score, and the context score; and publishing, by the first computing node, the updated trust score for the second computing node to the distributed ledger via a smart contract operation.

20. The non-transitory computer-readable medium of claim 19, wherein the context score corresponds to a physical distance between the first computing node and the second computing node.

* * * * *